2,769,835

PROCESS OF PRODUCING ALKYL ACRYLATES BY DEHYDROHALOGENATION USING AN ANHYDROUS CALCIUM SULFATE CATALYST

Milton Kosmin and Samuel Allen Heininger, Dayton, Ohio, assignors to Monsanto Chemical Company, St. Louis, Mo., a corporation of Delaware No Drawing. Application December 9, 1953,
Serial No. 397,258

6 Claims. (Cl. 260—486)

The present invention relates to the manufacture of alkyl acrylates, and more particularly provides an improved process for the preparation of alkyl acrylates from the corresponding $\beta$-chloropropionates.

In previous art, alkyl $\beta$-chloropropionates have been converted into alkyl acrylates by treating the chloro-esters with a basic material which splits off hydrogen chloride from said esters to form a compound of the basic material and the cleaved hydrogen chloride. Use of the basic dehydrohalogenating agents is of little economic importance in that thereby large quantities of basic materials must be consumed to yield, besides the desired alkyl acrylates, by-product salts of comparatively little, if any utility. The alkyl acrylates have also been prepared from alkyl $\beta$-chloropropionates by a catalytic process wherein vapors of the chloro-ester are contacted at high temperatures with an acidic material as in the Jacobi et al. U. S. Patent No. 1,934,613, or with a neutral catalyst having a large superficial area, i. e., activated carbon, as described in the Bauer et al. U. S. Patent No. 2,087,466. While such catalytic processes dispense with the basic reaction component, commercial utilization of these processes is not of economic feasibility in that the acidic catalysts appear also to favor side reactions such as re-addition of the cleaved hydrogen chloride to the acrylate and/or polymerization of the acrylate. Particularly when the acidic compound is a solid, formation of polymeric products in even very small quantities is disadvantageous in that consequent fouling of the catalyst prevents extensive use of the same. Neutral, activated carbon gives good conversions of $\beta$-chloropropionic acid to acrylic acid, but conversions of the alkyl $\beta$-chloropropionates to alkyl acrylates are of a low order in the presence of only the activated carbon; in order to improve the conversions an acidic promoter is used with the activated carbon.

Now we have found that very good catalytic conversion of the alkyl $\beta$-chloropropionates to the alkyl acrylates, without accompanying catalyst fouling, is obtained by contacting said chloro-esters with the substantially neutral, anhydrous calcium sulfate at temperatures substantially within the range 150° C. to about 375° C., and preferably at 200° C. to 325° C., depending upon the nature of the individual chloropropionate.

Dehydrochlorination of the chloropropionates to the acrylates may be effected in either the liquid or vapor phase when employing calcium sulfate as catalyst within the stated temperature range; however, best results are obtained in the vapor phase. The dehydrochlorination may be effected simply by heating the alkyl $\beta$-chloropropionate with a catalytic quantity, say, a quantity of from 0.5 percent to 5.0 percent by weight of the chloro-ester, while providing for removal of hydrogen chloride from the reaction zone, e. g., by applying vacuum. For optimum yields, however, we prefer to pass the liquid or vaporous chloro-ester through a properly heated column containing the calcium sulfate, and to cool the effluent product by conducting it to a condenser and/or cooled receiver. Immediate cooling of the effluent is effective in retarding addition of the evolved hydrogen chloride to the acrylate product. Constant withdrawal of the acrylate from the cooled zone and/or removal of the hydrogen chloride by a scrubbing operation generally suffices to prevent readdition. For convenience, particularly when operating on a small scale, the dehydrohalogenation reaction may be effected at reduced pressure, whereby the evolved hydrogen chloride is removed from the reaction zone by means of an aspirator, e. g. a water-pump suction.

In practice, we prefer to operate substantially as follows: We pack a quartz or glass tube having an internal diameter of, say, from 10 to 30 mm. and a length of, say, from 1 to 10 feet, with an anhydrous calcium sulfate such as that known to the trade as "Drierite." We apply external heat, raising the temperature of the tube to from 150° C. to 375° C., depending upon the individual alkyl $\beta$-chloropropionate employed. Into the tube we then introduce the chloro-ester, which may be the liquid ester, either at ordinary room temperature or preheated; a solution of the ester in an inert solvent, which solution may be at room temperature or preheated; or the volatilized ester or a volatilized solution of said ester in an inert solvent. When the liquid ester or solution thereof is employed, we may apply heat to the reaction tube in such a manner as to volatilize the chloro-ester before it enters the catalyst zone. When operating on a small scale, the liquid alkyl $\beta$-chloropropionate may also be dropped very slowly at the top of the catalyst chamber whereby volatilization may occur before it contacts the catalyst. However, volatilization of the reactant is unnecessary. The rate at which the chloropropionate is passed through the catalyst tube depends upon the heat capacity of the reactor. In laboratory experiments, employing the catalyst tube described above, we find that very good results are obtainable by passage of the chloro-ester at the rate of, say, 1 g. per from 30 to 120 seconds. In selecting both the optimum temperature and the optimum rate of addition, there must be determined not only the effect of these factors upon each other, but also of the reactor size and the nature of the alkyl $\beta$-chloropropionate.

Alkyl $\beta$-chloropropionates which are dehydrohalogenated to the corresponding alkyl acrylates by the present process are those having from 1 to 18 carbon atoms in the alkyl radical, e. g., methyl, ethyl, propyl, isopropyl, n-butyl, tert-butyl, n-amyl, isoamyl, n-hexyl, n-heptyl, 2-ethylhexyl, n-octyl, isononyl, n-decyl, tert-dodecyl, tridecyl, hexadecyl, octadecyl or tetradecyl $\beta$-chloropropionate. The alkyl radical may be derived from a technical mixture of alcohols such as the mixture of $C_{12}$–$C_{14}$ alkanols obtained by hydrogenation of coconut oil fatty acids, alcohols fractions prepared by the high pressure, high temperature reaction of carbon monoxide with hydrogen or by the "Oxo" process according to which a mixture of branched chain higher alkanols is prepared by the catalytic reaction of hydrogen, carbon monoxide and lower polymers of olefinic hydrocarbons such as triisobutylene, diisobutylene, tripropylene or tetrapropylene. The alkyl acrylates produced by the process are useful as monomers for the preparation of resinous polymers which are of considerable utility as molding resins and as lubricant additives.

The present invention is further illustrated, but not limited, by the following examples:

Example 1

This example describes preparation of ethyl acrylate from ethyl $\beta$-chloropropionate.

The dehydrohalogenation reaction was effected using the following equipment: A 2-foot long tubular glass reactor having a diameter of 22 mm. and an inside thermometer well at a point approximately half the length of the tube was connected at its upper end to a dropping funnel and at its lower end to a condenser attached to one neck of a 3-necked flask which served as the receiver. Another neck of said flask was connected to a series of two condensers, the second of which led to a suction pump aspirator. The flask was immersed in Dry Ice and served as a trap for the reaction product after it had traveled through the condenser. The reactor was packed with an anhydrous calcium sulfate known to the trade as "Drierite." Previous to the introduction of the reactant, vacuum was applied, and the reactor was heated to 250° C./26 mm. for a period of time to remove traces of moisture. Into the heated tube there was then dropped over a 5.0 hour period at a temperature of 300° C.–320° C. and a pressure of 28 to 30 mm. of mercury, 273 g. (2.0 moles) of ethyl β-chloropropionate. The reaction product was allowed to attain room temperature, washed with two 100 ml. portions of water, dried over sodium sulfate and distilled to give 76 g. of ethyl acrylate B. P. 98–102° C. This represents a conversion of 38% per pass and a 65% theoretical yield based on the consumed chloropropionate.

*Example 2*

This example describes conversion of nonyl β-chloropropionate into nonyl acrylate. The chloropropionate was prepared as described in our copending application, Serial No. 394,880, filed November 27, 1953, from acrylonitrile, hydrogen chloride and a mixture of branched chain, unsaturated $C_9$ alcohols obtained according to the "Oxo" process by the high pressure catalytic reaction of hydrogen, carbon monoxide and diisobutylene.

The apparatus and calcium sulfate catalyst described in Example 1 were used in the present dehydrohalogenation, the tubular reactor being maintained at 305°±5° C./30 mm. while passing through it, during a 4 hour period, 258.3 g. of the nonyl β-chloropropionate. The reaction product which had collected in the Dry Ice cooled receiver was washed with three 200 ml. portions of water and the aqueous washings were extracted with ether and the ether washings combined with the washed product. After drying the combined material overnight with sodium sulfate, in the presence of 2.0 g. of hydroquinone as stabilizer, it was filtered and distilled under partial pressure to give 126 g. of nonyl acrylate, B. P. 107–120° C./28 mm., $N_D^{25}$ 1.4335 and 56 g. of the unreacted nonyl β-chloropropionate. This represents a 58 percent one-pass conversion, and a 74 percent theoretical yield based on the consumed β-chloropropionate.

*Example 3*

This example describes conversion of a tridecyl β-chloropropionate to tridecyl acrylate. The tridecyl β-chloropropionate was prepared as described in our copending application, Serial No. 394,880, filed November 27, 1953, from acrylonitrile, hydrogen chloride and a mixture of branched chain, saturated $C_{13}$ alcohols obtained according to the "Oxo" process by the high pressure catalytic reaction of hydrogen, carbon monoxide and triisobutylene or tetrapropylene.

The apparatus and calcium sulfate catalyst described in Example 1 were used in the present dehydrohalogenation, the tubular reactor being maintained at 300–310° C./29–30 mm. while passing through it, during a 4 hour period, 290.7 g. of the tridecyl β-chloropropionate. The condensate which had collected in the Dry Ice-cooled flask was allowed to warm up gradually after breaking the vacuum in the system. It was then washed twice with 150 ml. portions of water. The washed condensate, together with an ether extract of the washings was dried over sodium sulfate and ether was removed from the dried material by distillation in presence of 2.0 g. of hydroquinone. When all of the ether had been stripped off, vacuum was applied and distillation was continued to give 219.5 g. of the substantially pure tridecyl acrylate, B. P. 102–119° C./1.0 mm. $N_D^{25}$ 1.4456 and 15.2 g. of the unreacted β-chloropropionate. This represents a one-pass conversion of 86.5% and a 91.2% theoretical yield based on the consumed β-chloropropionate.

*Example 4*

This example is like Example 3, except that a somewhat lower reaction temperature and a longer reaction time were used, 290.7 g. of the tridecyl β-chloropropionate of Example 3 being passed during 5 hours, through the same calcium sulfate-packed reactor at 260–290° C./28 mm. (mainly 285° C./28 mm.). At the end of that time 267 g. of material had collected in a cooled receiver. It was washed 3 times with water, and filtered through sodium sulfate. The filtrate was allowed to stratify into an aqueous and an organic phase, and the aqueous phase was separated, ether extracted, and the ether extract combined with the organic phase. The combined material was then fractionally distilled, in vacuo and in the presence of 2.0 g. of hydroquinone to give 210 g. of the substantially pure tridecyl acrylate, B. P. 99–106° C./0.5 mm., $N_D^{25}$ 1.4463 and 36.6 g. of unchanged tridecyl β-chloropropionate. This represents a one-pass conversion of 82.5% and a 94.2% theoretical yield based on the consumed β-chloropropionate.

In the above examples, reaction was effected under reduced pressure. Although we find very good conversion to the alkyl acrylates is obtained by reaction under a diminished pressure, say a pressure of from 10 to 300 mm. of mercury, good yields are also obtainable when employing atmospheric or even superatmospheric pressures, the amount of pressure employed varying with the type of reaction equipment used.

In each of the above examples, no catalyst fouling was observed, in some instances the same catalyst being used over and over again for repeated runs without observing any change in the activity of the same.

While the above examples are limited to the preparation of ethyl, nonyl or tridecyl acrylate, the present process provides for preparation of other alkyl acrylates from the corresponding alkyl β-chloropropionates, e. g., of methyl acrylate from methyl β-chloropropionate, of n-butyl acrylate from n-butyl β-chloropropionate, of tert-amyl acrylate from tert-amyl β-chloropropionate, of 2-ethylhexyl acrylate from 2-ethylhexyl β-chloropropionate, of tert-dodecyl acrylate from tert-dodecyl β-chloropropionate, octadecyl acrylate from octadecyl β-chloropropionate, etc.

What we claim is:

1. The method which comprises contacting an alkyl β-chloropropionate having from 1 to 18 carbon atoms in the alkyl radical with anhydrous calcium sulfate at a temperature of from 150° C. to 375° C. and recovering from the resulting reaction product an alkyl acrylate having from 1 to 18 carbon atoms in the alkyl radical.

2. The method which comprises passing an alkyl β-chloropropionate having from 1 to 18 carbon atoms in the alkyl radical through a reaction zone maintained at a temperature of 150° C. to 375° C. and containing anhydrous calcium sulfate, cooling the effluent therefrom to obtain a condensate and recovering from said condensate an alkyl acrylate having from 1 to 18 carbon atoms in the alkyl radical.

3. The method which comprises contacting an alkyl β-chloropropionate having from 1 to 18 carbon atoms in the alkyl radical with anhydrous calcium sulfate at a pressure below atmospheric and a temperature of from 200° C. to 325° C. and recovering from the resulting reaction product an acrylate having from 1 to 18 carbon atoms in the alkyl radical.

4. The method which comprises contacting an ethyl β-chloropropionate with anhydrous calcium sulfate at a pressure below atmospheric and at a temperature of from 200° C. to 325° C. and recovering ethyl acrylate from the resulting reaction product.

5. The method which comprises contacting nonyl β-chloropropionate with anhydrous calcium sulfate at a pressure below atmospheric and at a temperature of from 200° C. to 325° C. and recovering nonyl acrylate from the resulting reaction product.

6. The method which comprises contacting tridecyl β-chloropropionate with anhydrous calcium sulfate at a pressure below atmospheric and at a temperature of from 200° C. to 325° C. and recovering tridecyl acrylate from the resulting reaction product.

References Cited in the file of this patent

UNITED STATES PATENTS 2,210,564    Andrussow et al. _____ Aug. 6, 1940